United States Patent [19]
Stein et al.

[11] Patent Number: 5,826,241
[45] Date of Patent: Oct. 20, 1998

[54] COMPUTERIZED SYSTEM FOR MAKING PAYMENTS AND AUTHENTICATING TRANSACTIONS OVER THE INTERNET

[75] Inventors: Lee H. Stein, Rancho Santa Fe; Einar A. Stefferud, Huntington Beach, both of Calif.; Nathaniel S. Borenstein, Morristown, N.J.; Marshall T. Rose, Mountain View, Calif.

[73] Assignee: First Virtual Holdings Incorporated, San Diego, Calif.

[21] Appl. No.: 308,101

[22] Filed: Sep. 16, 1994

[51] Int. Cl.⁶ ............................................. G06F 17/00
[52] U.S. Cl. ........................................ 705/26; 705/1
[58] Field of Search .................................. 364/401, 405, 364/408

[56] References Cited

U.S. PATENT DOCUMENTS

| | | |
|---|---|---|
| 4,528,643 | 7/1985 | Freeny, Jr. . |
| 4,759,063 | 7/1988 | Chaum . |
| 4,759,064 | 7/1988 | Chaum . |
| 4,914,698 | 4/1990 | Chaum . |
| 4,926,480 | 5/1990 | Chaum . |
| 4,947,028 | 8/1990 | Gorog . |
| 4,947,430 | 8/1990 | Chaum . |
| 4,949,380 | 8/1990 | Chaum . |
| 4,996,711 | 2/1991 | Chaum . |
| 5,283,829 | 2/1994 | Anderson . |
| 5,291,554 | 3/1994 | Morales . |
| 5,329,589 | 7/1994 | Fraser et al. . |
| 5,420,926 | 5/1995 | Low et al. . |
| 5,557,518 | 9/1996 | Rosen . |
| 5,590,197 | 12/1996 | Chen et al. . |

OTHER PUBLICATIONS

"Bill Paying Put On Line", *Electronic Engineering News* Mar. 20, 1995 and The Netbill Electronic Commerce Project, May 15, 1995 (Last Update).

"Press Release For Cari, The Internet Voice Robot", Apr. 10, 1995 and Frequently Asked Questions About Cari, Undated.

Newsbytes News Network, 15 Feb. 1995, Wendy Bounds, Jared Sandberg, "Carnegie Mellon, Visa Plan to offer payment system for data from Internet", all.

Bank Systems & Technology, v32 n1, 06 Jan. 1995, jacqueline Day, "Industry Players in hot pursuit of secure Internet transaction mode", all.

Advertising Age, 19 Dec. 1994, Curtis Lang, "Cashing in: The rush is on to buy and sell on the Internet", pp. 11–12.

PC Week, 20 Mar. 1995, v12 n11 p1(2), Anne Knowles, "Improved Internet security enabling on–line commerce", all.

The Wall Street Journal, pB7 (W) pB9 (E) col 1, 09 Nov. 1994, Don Clark, "Microsoft, Visa to ointly develop PC electronic–shopping software", abstrat only.

(List continued on next page.)

*Primary Examiner*—Gail O. Hayes
*Assistant Examiner*—Phillip Groutt
*Attorney, Agent, or Firm*—Brinks Hofer Gilson & Lione

[57] ABSTRACT

A payment system for enabling a first Internet user to make a payment to a second Internet user, typically for the purchase of an information product deliverable over the Internet. The payment system provides cardholder accounts for the first and second Internet users. When the second user sends the information product to the first user over the Internet, the second user also makes a request over the Internet to a front end portion of the payment system requesting payment from the first user. The front end portion of the payment system queries the first user over the Internet whether to proceed with payment to the second user. If the first user replies affirmatively, a charge to the first user is processed off the Internet; however if the first user replies negatively, the first user is not charged for the information product. The payment system informs the second user regarding whether the first user's decision and pays the second user upon collection of the charge from the first user. Security is maintained by isolating financial and credit information of users' cardholder accounts from the front end portion of the payment system and by isolating the account identifying information from the associated e-mail address.

62 Claims, 9 Drawing Sheets

OTHER PUBLICATIONS

Information Today, v12 n3 p. 43, Mar. 1995, "The Check is in the e–mail", all.

Network World, v11 n50 p1, 12 Dec. 1994, Adam Gaffin, "Avrsion therapy: Banks overcoming fear of the 'net", all.

Communications of the ACM, v37 n11 pp. 12–21, Nov. 1994, Larry Press, "Commercialization of the Internet", all.

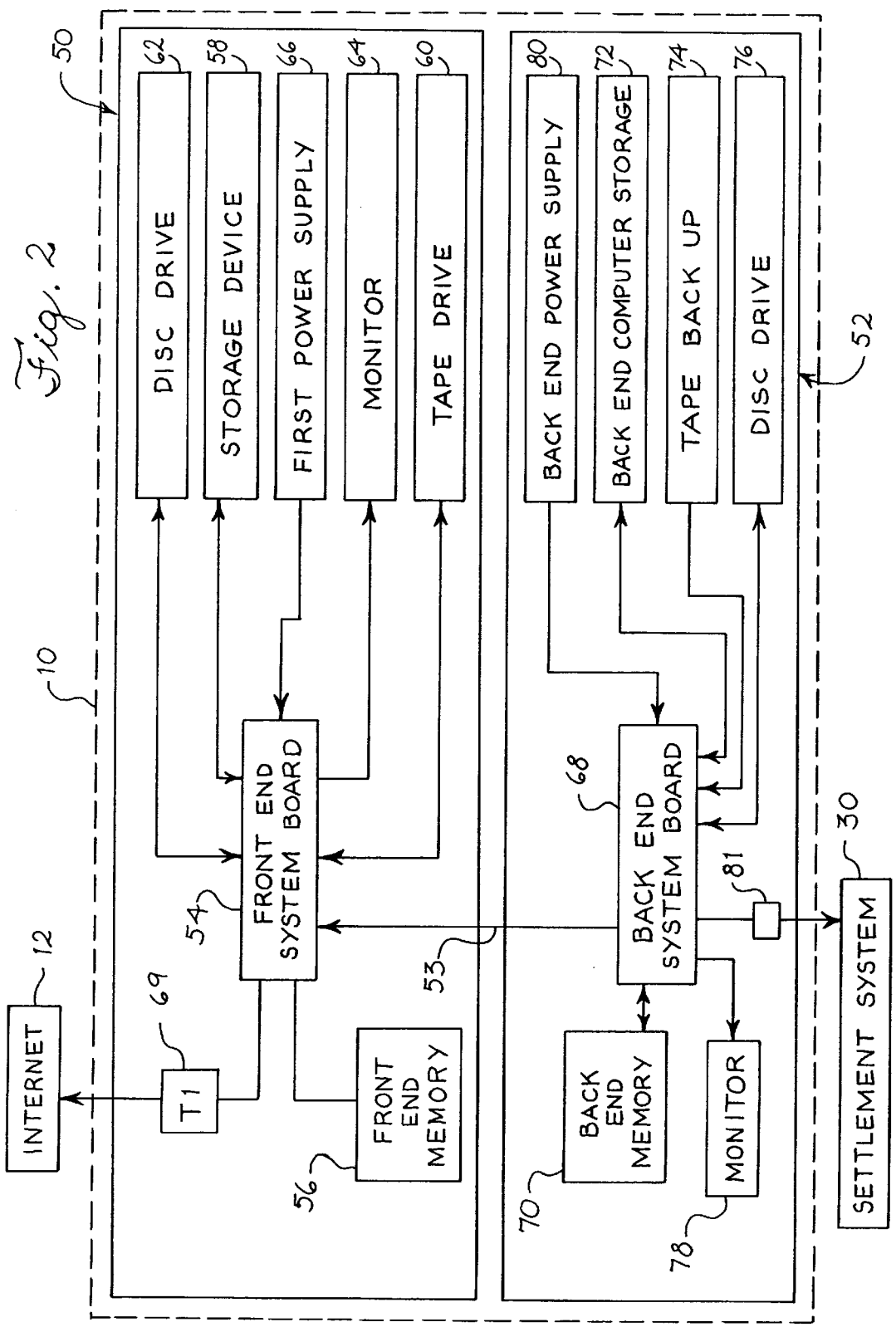

Fig. 6I COLLECTION-FAILURE NOTIFICATION: 138, 134, 112, ... — 211

Fig. 6L PAYIN-CHARGEBACK NOTIFICATION: 144, 134, ... — 220

Fig. 6H PAYIN-FAILURE NOTIFICATION: 144, 108B, 134, 112, ... — 210

Fig. 6K PAYOUT-NOTIFICATION: 102, 150, 152, 146, 149, ... — 214

Fig. 6G TRANSFER-RESULT: 142, 105S, 103B, 130, 132, 135, 152, 136, 112S, 134, ... — 160

Fig. 6J PAYIN-NOTIFICATION MESSAGE: 102B, 134, 112, 144, 146, 148, ... — 212

Fig. 6O

CAPABILITIES – RESULT
| 156 |
| 158 |
| 159 |
⋯

CAPABILITIES – REQUEST
⋯

NEWACCT – RESULT
| 106 |
| 102 |
⋯

PAYOUT – CHARGEBACK NOTIFICATION
| 138 |
| 134 |
| 112 |
⋯

APPLICATION – RESULT
| 104 |
| 112 |
⋯

228

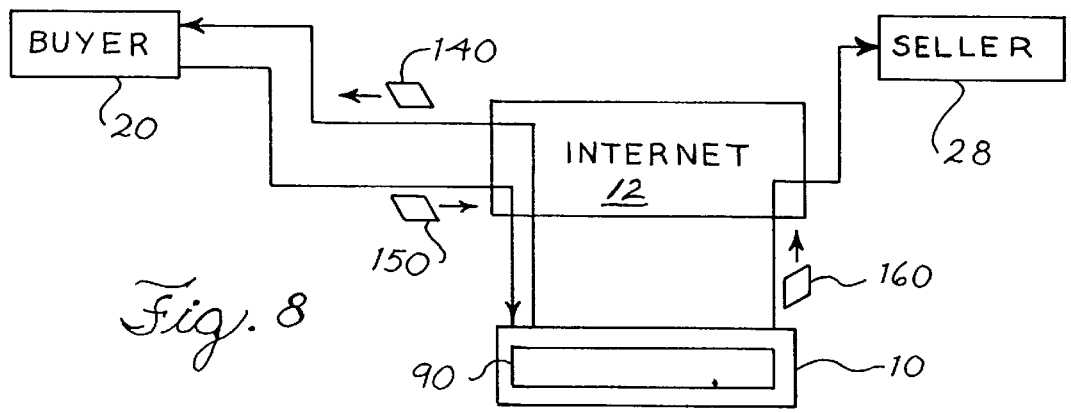
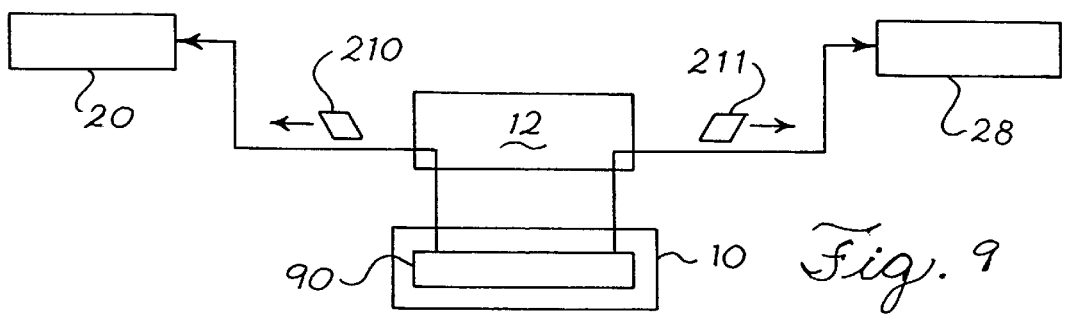
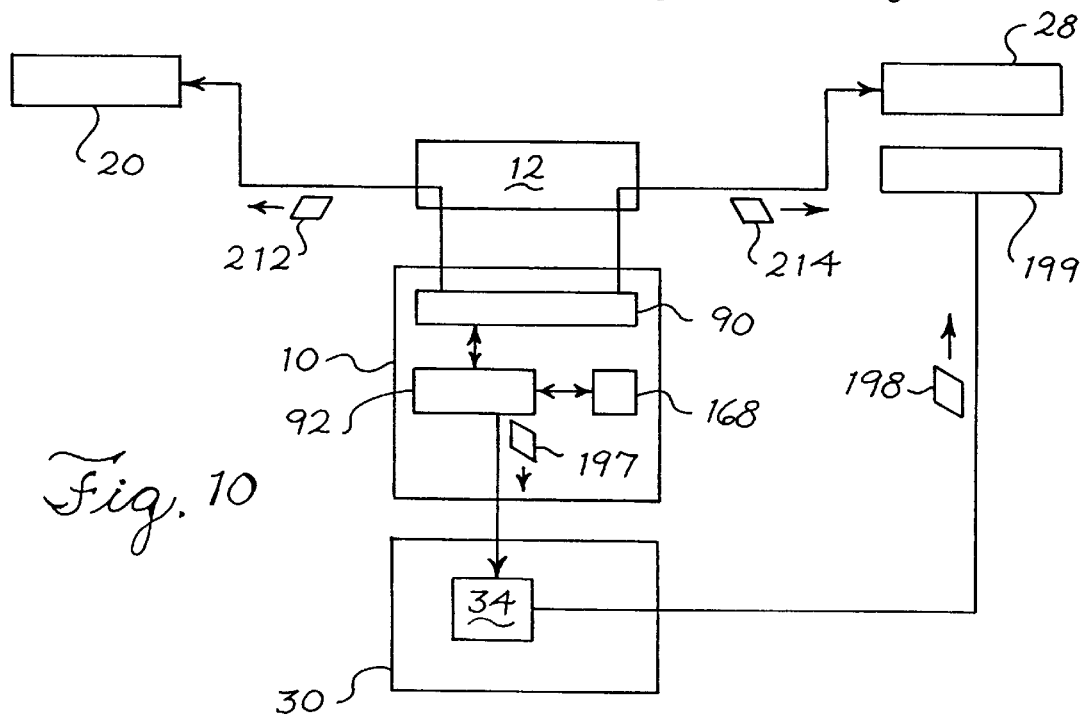

5,826,241

COMPUTERIZED SYSTEM FOR MAKING PAYMENTS AND AUTHENTICATING TRANSACTIONS OVER THE INTERNET

MICROFICHE APPENDIX

Included are seven microfiche of 666 total frames.

BACKGROUND OF THE INVENTION

The present invention relates to a system for enabling payment for information products that can be transferred electronically over a nonsecure network, and more particularly, the present invention relates to a payment system that can be used to enable an Internet user to make a payment to another Internet user for information products of value that can be electronically transferred over the Internet.

The Internet has emerged as a large community of electronically-connected users located around the world who readily and regularly exchange significant amounts of information. The Internet continues to serve its original purposes of providing for access and exchange of information among government agencies, laboratories, and universities for research and education. In addition, the Internet has evolved to serve a variety of interests and forums that extend beyond its original goals.

The Internet has been considered as a potential new marketplace for information products. It is now physically possible to transfer information products such as articles, software, cartoons, etc., via the Internet.

Using the Internet as a marketplace has several advantages. Information products can be delivered electronically without physical packaging. Because information is easily duplicated with the point and click of a mouse on a user's workstation, the cost of manufacturing and reproducing inventory closely approaches zero, leaving the cost of creating or synthesizing the information as the dominant cost. Once an information product has been developed, there may be little or no cost of manufacturing or inventory since a copy of the product can be shipped whenever a buyer makes a purchase given that the merchant has the bandwidth available. Given that the cost of inventory on the Internet is close to zero, there are potentially tens of thousands of information sellers, i.e. people with ideas or information products to sell, on the Internet. Another advantage of using the Internet as a marketplace is that, depending on the kind of information product involved, processing of a buyer's order can be automated, so there is no need for a worker to manually intervene to complete a transaction.

Although the Internet presently has the capability to serve as a marketplace for new information products, use of the Internet for this purpose has been slow to develop. One reason that accounts for this lack of development is that it is difficult to pay for information products using the Internet. A user cannot send cash or a check via the Internet and sending a check via physical delivery services is slow. Sending a credit card number over the Internet poses security problems. Moreover, even if it were reasonably safe to send credit card numbers, there are a lot of potential sellers of information products who do not have—and could not qualify for—the required merchant accounts. Credit card companies require a seller who accepts credit card for payment, to have a merchant account. Conventional merchant accounts require a relatively high standard of credit worthiness and a financial guarantee. The need for a conventional merchant account impedes commerce in the Internet marketplace because an average Internet user may have a difficult time qualifying for a merchant account.

Accordingly, there is a need for a system that solves the payment problem on the Internet to enable development of a commercial market.

SUMMARY OF THE INVENTION

According to a first embodiment of the present invention, there is provided a method and payment system for enabling a first Internet user to make a payment to a second Internet user, typically for the purchase of an information product deliverable over the Internet. The payment system provides cardholder accounts for the first and second Internet users. When the second user sends the information product to the first user over the Internet, the second user also makes a request over the Internet to a front end portion of the payment system requesting payment from the first user. The front end portion of the payment system queries the first user over the Internet whether to proceed with payment to the second user. If the first user replies affirmatively, a charge to the first user is processed off the Internet; however if the first user replies negatively, the first user is not charged for the information product. The payment system informs the second user regarding whether the first user's decision and pays the second user upon collection of the charge from the first user. Security is maintained by isolating financial and credit information of users' cardholder accounts from the front end portion of the payment system and by isolating the account identifying information from the associated e-mail address.

BRIEF DESCRIPTION OF THE DRAWINGS

These and other features, aspects, and advantages of the present invention will become better understood with regard to the following description, appended claims, and accompanying drawings where:

FIG. 2 is a block diagram of a hardware configuration for the payment system of FIG. 1.

FIG. 8 is a flow chart showing the message flow for a transfer query request and reply using the payment system of FIG. 1;

FIG. 9 is a flow chart showing the message flow for payment failure using the payment system of FIG. 1;

FIG. 10 is a flow chart showing the message flow for payment notification using the payment system of FIG. 1;

DETAILED DESCRIPTION OF THE PREFERRED EMBODIMENTS

I. Overall System

Figure 1:
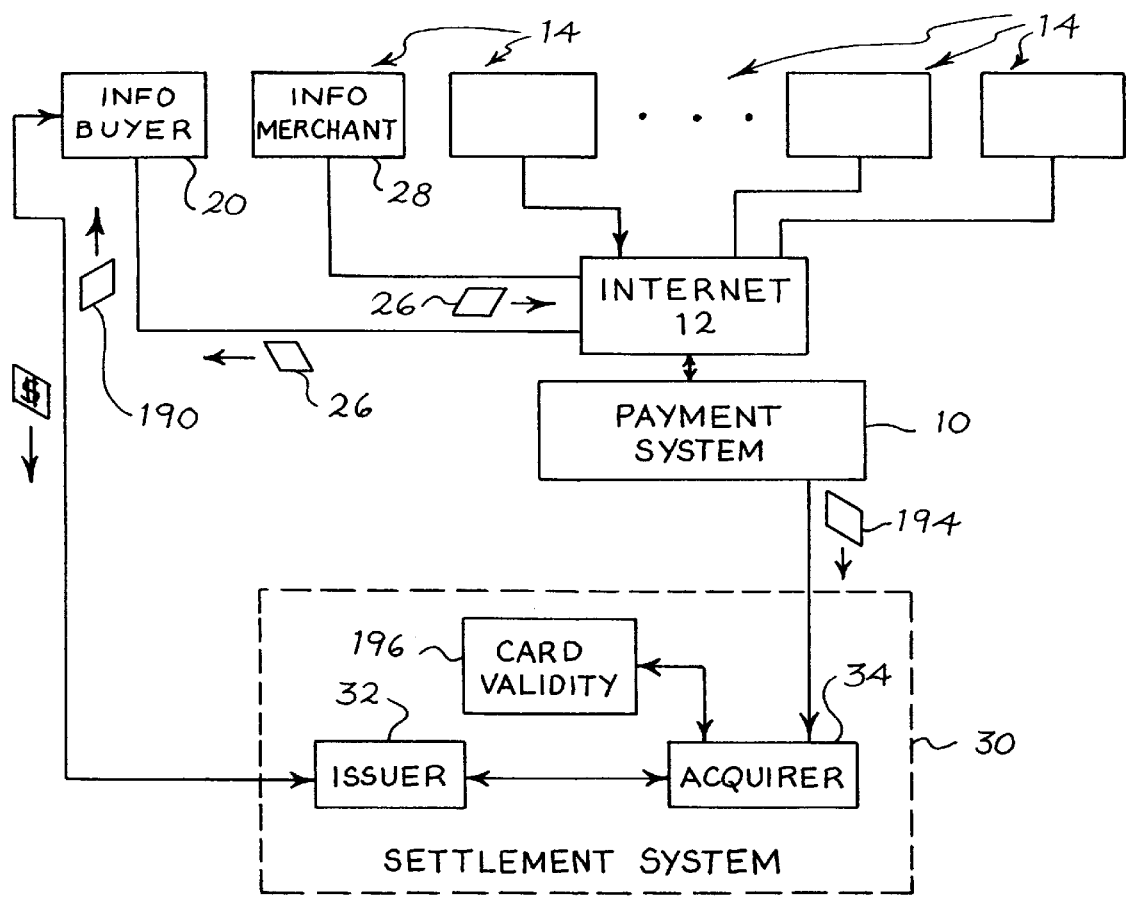
FIG. 1 is a block diagram illustrating the relationship between a payment system of a first embodiment of the present invention to a large network.

FIG. 1 shows a block diagram of a first embodiment of the present invention for a payment system 10. The payment system 10 is shown in relation to the Internet network 12. The Internet network 12 is a large, quasi-public network having many users 14. The Internet network 12 is of a type that the users 14 can access by various means such as conventional commercial telephone systems. The network 12 provides numerous services for its users such as e-mail or World Wide Web (WWW). Although the payment system 10 is specifically useful for the Internet, it may be used in conjunction with other e-mail based systems having a plurality of users.

In the embodiment of FIG. 1, one of the users 14 (designated as an information buyer 20) wishes to acquire an information product 26 from another of the users (designated as an information seller 28). The information seller 28 may be any user with an information product to vend. The information product 26 can be any item that is transferable over the Internet network 12. The information product 26 may be a message, an article, an original work of authorship, a composition, a writing, music, a pictorial work, a drawing, a cartoon, a story, a software program, a recipe, jokes, and so on. The information seller 28 wishes to sell a copy of the information product 26 to the information buyer 20 at a price. The price may be an advertised price (e.g. advertised over the Internet, on a bulletin board, or other media), or may be a negotiated price (e.g. negotiated via e-mail exchange). Although the example of FIG. 1 shows only one information seller 28 and one information buyer 20, the payment system 10 is understood to extend to include multiple buyers of one seller, multiple sellers to one buyer, and multiple sellers and multiple buyers. Also, a buyer or a seller may be an individual, a company, or an institution.

Also shown in FIG. 1 is a financial transaction settlement system 30. The financial transaction settlement system 30 represents presently-available commercial institutions that process credit and other financial transactions. For example, the financial transaction settlement system 30 may represent commercially available credit card processing institutions (e.g. Visa, Master Card, Discover, and so on). The financial transaction settlement system 30 includes two components: an issuer 32 and an acquirer 34. The issuer 32 includes banks, or other institutions, that issue credit cards to persons, sends statements and bills to credit card holders on a regular basis, and collects payment from the credit card holders. These functions are not performed on the Internet but use conventional mail delivery, authorized direct withdrawals from bank accounts, etc. The payment system 10 of the present embodiment utilizes these commercially available issuers 32 to bill users and to collect payment from users for their transactions on the Internet 12 using the payment system 10. For example, a user's transactions using the Internet would show up on the user's credit card statement as a charge from the payment system 10 although individual transactions using the payment system 10 on the Internet 12 may not be specifically listed on the credit card statement. The financial transaction settlement system 30 also includes the acquirer component 34. This acquirer component 34 is a bank or other institution that provides a merchant account to the payment system 10. The merchant account provided to the payment system 10 is similar or identical to the conventional merchant accounts that are provided to other businesses. By means of having the merchant account, the payment system 10 forwards user charges to the acquirer component 34 thereby getting user charges into a conventional, commercially-available settlement system. As mentioned above, the acquirer 34 processes the user charges received from the payment system and passes this information to the issuer component 32 for the preparation and sending of monthly statements and bills to users and collecting payment from users.

FIG. 2 is a block diagram illustrating one possible configuration of hardware components used to implement the payment system 10 of FIG. 1. The payment system 10 includes two computers: a front end computer 50 and a back end computer 52. The front end computer 50 and the back end computer 52 are connected together via a private network 53. In a preferred embodiment, the private network is an Ethernet network. The front end computer 50 includes a front end system board 54 associated with a front end memory 56, a storage device 58 such as a fixed disk drive, a back up tape drive 60, a removable media drive 62, a monitor 64, and a power supply 66. The front end computer 50 is connected to the Internet 12 is by means of a leased T1 line 69.

The back end computer 52 includes a back end computer system board 68 associated with a back end computer memory 70, a back end computer storage device 72 such as a fixed disk drive, a back up tape drive 74, a removable media drive 76, a monitor 78, and a power supply 80. The back end computer 52 is connected to the front end computer 50 by means of Ethernet cable. The back end computer 52 also has a Novell LAN 81 that provides a communication link to the settlement system 30.

Both the front end computer 50 and the back end computer 52 in this embodiment are preferably commercially available Sun Microsystems SS1000 computers. Preferably, both the front end computer 50 and the back end computer 52 are equipped with 64 MB memory. The dedicated private network is an Ethernet and includes a SBus host adaptor. The communication server is a Sun Microsystems SPARCserver 1000. Both the front end monitor 64 and the back end monitor 78 are commercially available Sun 17" monitors. The front end and back end tape drives are Python 5 GB tape drives using 4 mm tape available from Sony, Inc. The front end disk drive 58 and the back end disk drive 72 are commercially available Seagate 1.7 GB disk drives. The host adaptor is a Sun Microsystems SBus host adaptor. The network server is a commercially available Sun Microsystems SSarray 101.

Figure 3:
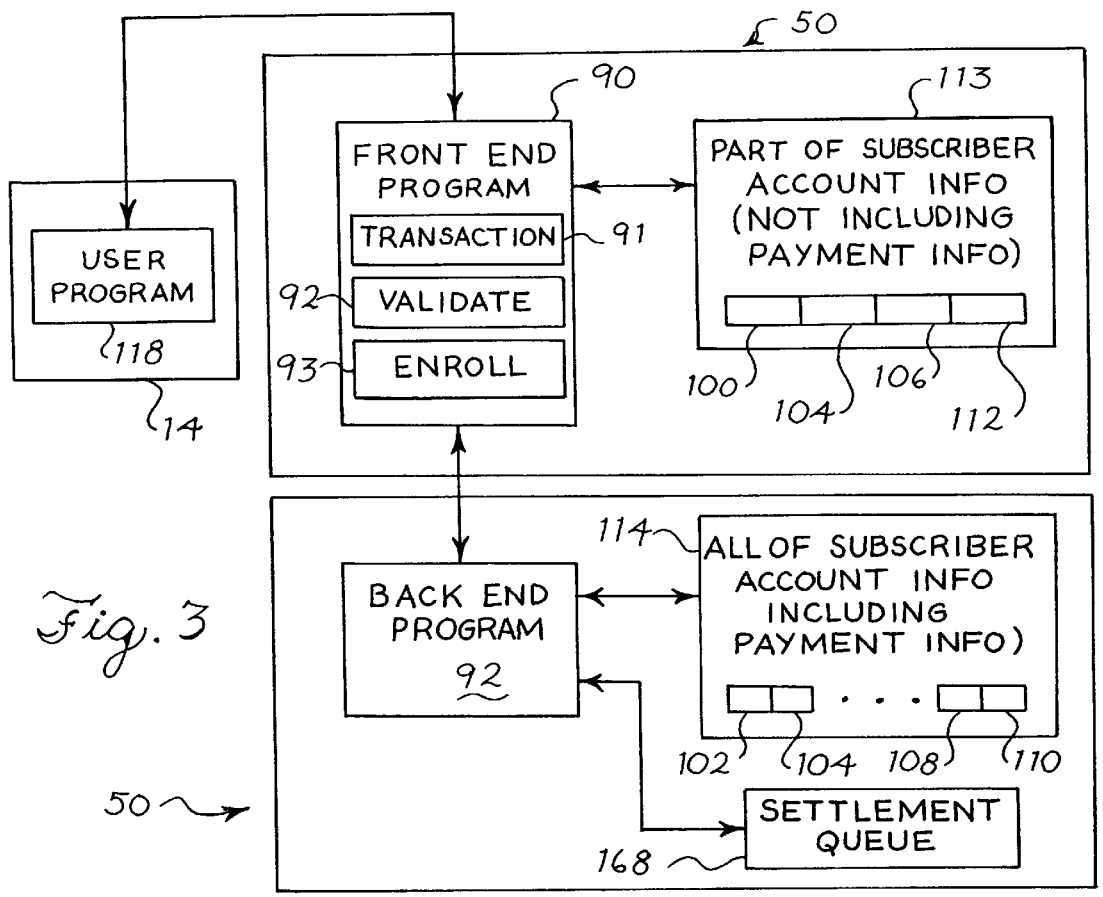
FIG. 3 is a block diagram of the program arrangement of the payment system of FIG. 1.

Referring to FIG. 3, the front end computer 50 runs a front end program 90. The front end program 90 is a software program that provides for communication with users 14 on the Internet network 12. The front end program 90 includes several modules that can be accessed and used by users 14 of the Internet. The modules included on the front end program include modules that permit users 14 to make a funds transfer transaction 91, to check a subscriber's status 92, to enroll as subscribers 93, etc.

The back end computer 52 runs a back end program 92. Thus, the front end program 90 is physically separate and isolated from the back end program 92. The back end program 92 receives information from and sends information to the front end program 90 only by means of batch processing. This results in an inherently safe method of communicating between the publicly accessible part of the payment system, i.e. the front end computer 50, and the secure part of the payment system, i.e. the back end computer 52.

II. Requirements Of A Subscriber

In order to use the payment system 10 for transactions, the information buyer 20 and the information seller 28 both need to have subscriber or cardholder accounts with the payment system 10. As subscribers, users of the Internet network 12 may conduct commercial transactions with each other, such as paying for information products 26, making charitable contributions, etc.

Figure 4:
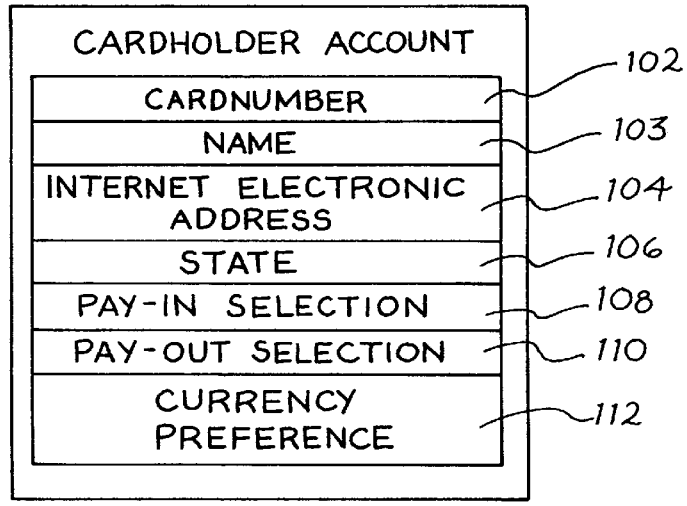
FIG. 4 is a diagram of data for a cardholder account for use with the payment system of FIG. 1.

Referring to FIG. 4, a cardholder account 100 includes at least the following information: a cardnumber 102, an Internet e-mail address 104, a state 106, a pay-in selection 108, a pay-out selection 110, and a currency preference 112. Each of these items is explained below.

The cardnumber 102 uniquely identifies the cardholder account 100. The cardnumber 102 is an alphanumeric string that is easily typed and read by a human. Also, the cardnumber 102 is relatively hard to guess and bears no deducible relationship to any financial artifact, such as a credit cardnumber, a checking account number, nor to any e-mail address.

The cardholder Internet e-mail address 104 is the e-mail address of the cardholder that is unique for each user of the Internet.

The state 106 is one of "active", "suspended", or, "invalid".

The pay-in selection 108 is how the cardholder transfers funds, i.e. makes payment, to the payment system 10. Typically, this may be done by using a conventional authorization to charge a credit card. The pay-in selection is not encoded in or directly derivable from the cardnumber.

The pay-out selection 110 is how a the payment system 10 transfers funds to, i.e. pays, the cardholder. This may include use of a direct deposit checking account, etc. The pay-out selection 110 is not encoded in or directly derivable from the cardnumber.

The currency preference 112 is the national currency used for the pay-in selection 108 and pay-out selection 110 between the payment system 10 and the subscriber.

Subscriber account information is distributed in the payment system 10. Referring again to FIG. 3, only a portion of the subscriber account information resides on the front end computer 50 where it is accessible by the front end program 90. However, a full copy of all the cardholder account information resides on the back end computer 52 where it is accessible by the back end program 92. Included on the back end computer 52 is a copy of the portion of the cardholder information on the front end computer 50. Specifically, the part of the subscriber account information that resides on the front end computer 50 is located in a data file 113 stored on the front end computer storage device 58. The subscriber account information that resides on the back end computer 52 is located in a data file 114 stored on the back end computer storage device 72.

Specifically with respect to the items of information in a cardholder account, located on the storage device 58 associated with the front end computer 50 is that portion of the subscriber account information 106 that includes the subscriber account number 102, the Internet e-mail address information 104, the state 106, and the currency preference 112. However, the front end computer 50 does not contain any of the pay-in 108 or pay-out 110 information, such as credit card information, etc., associated with any of the subscribers. Credit card or other payment information is located only in the data file 114 on the storage device 72 of back end computer 52

To access the front end program 90 over the Internet, users 14 may use a user interface software program 118 that can be run on their own computers for interactive access, or alternatively, users 14 may access the payment system 90 via conventional e-mail programs, for store-and-forward access. Programs 90 and 118 may be written in any suitable programming language, such as Tcl or C. The software modules are capable of being used with the UNIX operating system, DOS, and may be ported to various other operating systems. Listings of code for the front end program 90 and the user interface program 118 are included at appendices A and B, repectively. A publication entitled "The application/green-commerce MIME Content-type" is included at appendix C and includes a format for Internet communication for use between users of the Internet and the payment system 10.

III. Methods Of Operation Of The Payment System

As mentioned above, the payment system 10 provides users of the Internet with a variety of services and functions, including making a funds transfer transaction, validating a subscriber's status, and enrolling as a subscriber. Several of these services and functions are described below.

A. Funds Transfer Transaction

A funds transfer transaction occurs when one Internet user who is a subscriber, i.e. who has a cardholder account on the payment system 10, acting as an information seller 28, requests payment from another cardholder, acting as an information buyer 20. Typically, this may occur when a buyer 20 purchases an information product 26 over the Internet 12. However, this transaction may result for other reasons, e.g. to facilitate charitable contributions, to pay for computer or software customer support, etc.

For purposes of the example described below, it is assumed that the buyer 20 already is aware that the seller 28 has an information product 26 to sell and that a price has been established. The buyer 20 may be aware of the seller 28 and his information product via advertising, on the Internet or other media, through others, from a bulletin board, from a product warehouse on the Internet, or any other means. The buyer 20 is aware of a means to contact the seller via the Internet. The buyer 20 may contact the seller 28 by sending a message to the seller's Internet address or by an interactive protocol, World Wide Web (WWW), FTP, etc., so that a message can be sent to the seller 28. The means to contact the seller may be included in advertising, etc.

Figure 5:
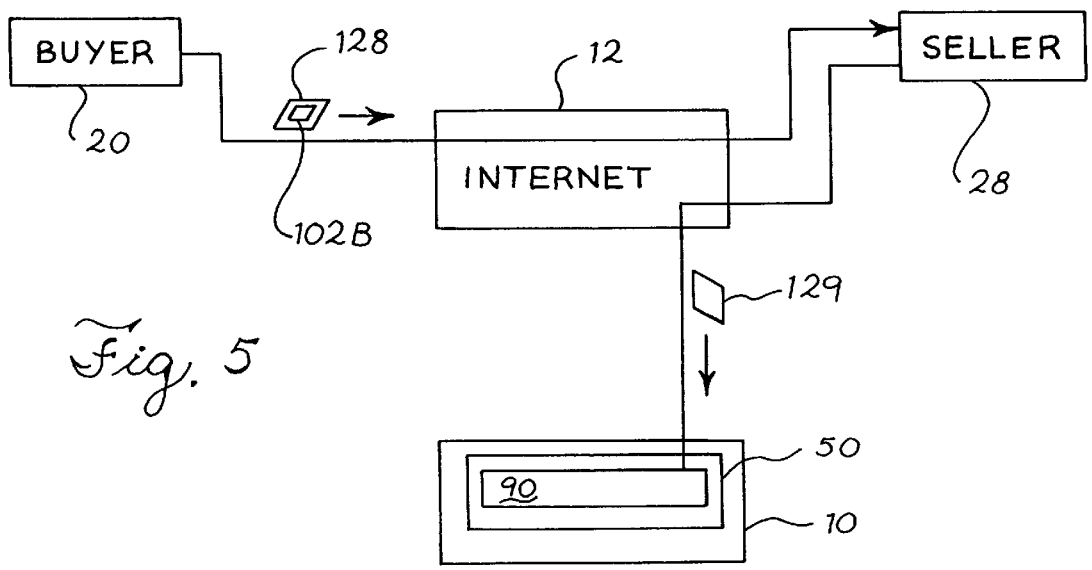
FIG. 5 is a flow chart showing message flow for the initial steps of a funds transaction using the payment system of FIG. 1.
Figure 6C:
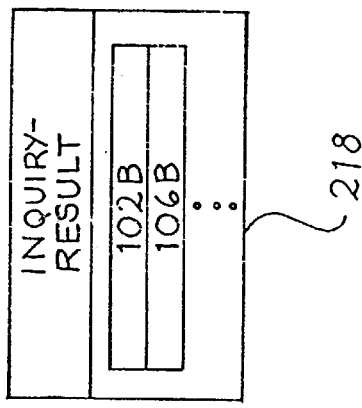
FIGS. 6A–6Q are diagrams of data messages used in connection with the payment system of FIG. 1.
Figure 6F:
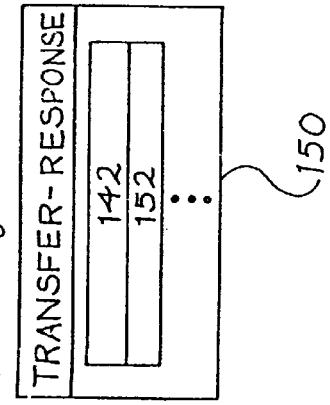
Figure 6B:
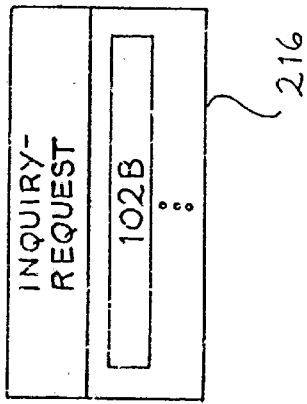
Figure 6E:
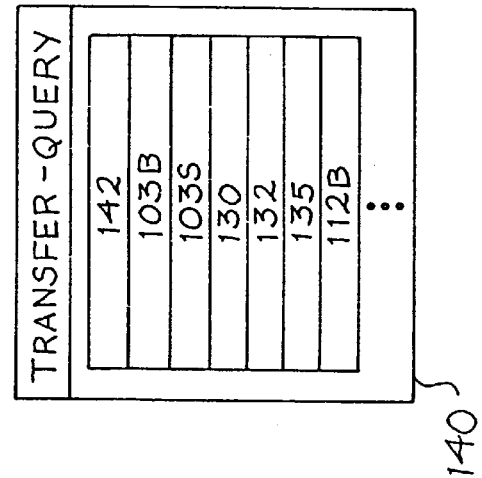
Figure 6A:
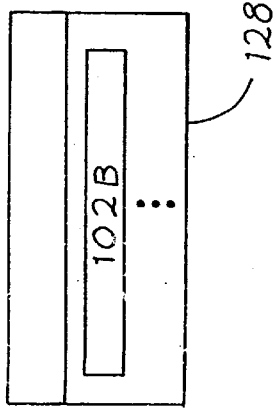

FIG. 5 shows an initial part of the message flow for a funds transfer transaction according to the first embodiment of the present invention. The Internet user who is the buyer 20 sends a message 128 to (or otherwise communicates with by means of interactive protocols, WWW, etc.) the Internet user who is the seller 28 via the Internet 12. The communication 128 sent by the buyer 20 to the seller 28 includes the buyer's cardnumber 102B ("102B"=cardnumber "102"+ buyer "B"), as illustrated in FIG. 6A. The buyer's message 128 is the first step in initiating the funds transfer transaction using the payment system 10. Alternatively, the buyer 20 may include the cardnumber 102B as a username in a file transferred from the buyer 20 to the seller 28 using the Internet 12.

B. Inquiry Transactions

At this stage, the seller 28 may wish to communicate with the payment system 10 to have a cardnumber inquiry transaction performed on the buyer's cardholder number. A cardnumber inquiry transaction occurs when one cardholder wishes to ascertain the state 106 of another cardholder's account. Typically, a cardnumber inquiry transaction occurs when one cardholder, acting as a seller, is deciding whether to send an information product 26 to another cardholder, who represents to be a cardholder and who is interested in acquiring the information product from the seller 28.

Figure 7:
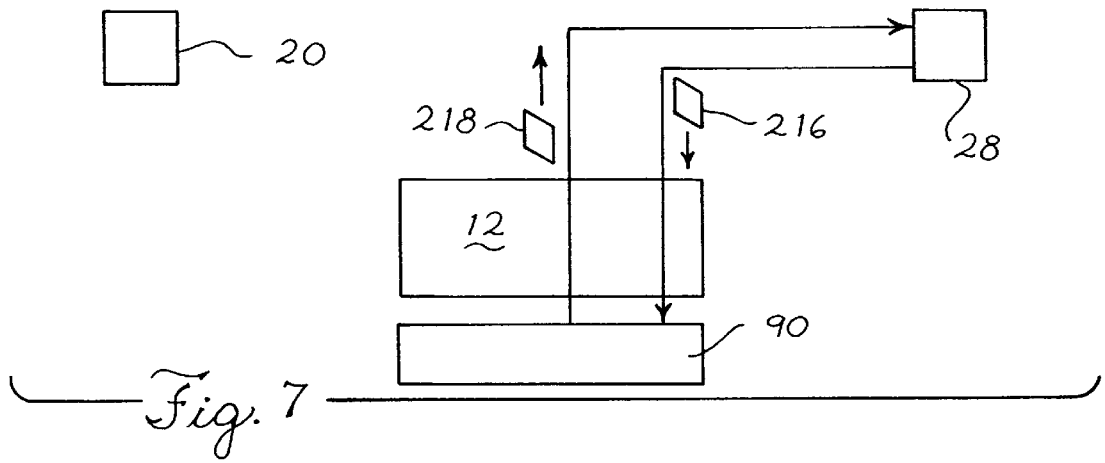
FIG. 7 is a flow chart showing the message flow for a cardholder inquiry request using the payment system of FIG. 1.

Referring to FIG. 7, the seller 28 may send an inquiry-request message 216 containing the buyer's cardnumber 102B to the front end program 90 using the Internet 12. As shown in FIG. 6B, the inquiry-request message 216 contains at least the buyer's cardnumber 102B. In response, the front end program 90 sends the seller 28 an inquiry-result message 218. As shown in FIG. 6C, the inquiry-result message 218 contains the buyer's cardnumber 102B and the state 106B associated with the buyer's account. If the buyer's cardholder account state 106B is "active", presumably the buyer is in good standing and the seller 28 can proceed with the transaction by sending the information product 26 to the buyer 20 via the Internet. If the buyer's cardholder account status 106B is "invalid", the seller 28 knows that the account is no good and that funds transfer transactions cannot be processed through it. If the buyer's cardholder account status 106B is "suspended", the seller knows that the buyer 20 has not been responsive to recent transaction attempts. The seller 28 may still decide to send the information product 26 to the buyer 20 and a funds transfer transaction will be processed. No guarantee of payment is made however.

Although an information seller 28 may prefer to send an inquiry-request 216 to the payment system 10 prior to sending an information product to the buyer 20, the seller 28 may choose to skip the inquiry-request step. At this stage, the seller 28 sends the information product 26 to the buyer 20 via the Internet.

Funds Transfer Transaction (Continued)

Figure 6D:
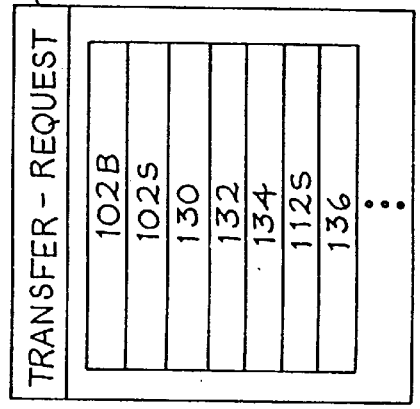

Referring again to FIG. 5, at approximately the same time that the seller 28 sends the information product to the buyer 20 via the Internet, the seller 28 also sends a transfer-request message 129 to the payment system 10 via the Internet 12. Specifically, the seller 28 sends the transfer-request message 129 to the front end program 90 on the front end computer 50. The transfer-request message 129 may be sent by either e-mail or using an interactive protocol on the Internet 12. Referring to FIG. 6D, the transfer-request message 129 contains the following information: the buyer cardnumber 102B, the seller cardnumber 102S, a transfer type 130 (e.g., sale of information), a textual description 132 of the transaction, a transfer amount 134, the currency 112S (e.g., USD); and optionally, the merchant's transaction-identifier 136.

After receiving the transfer-request message 129, the front end program 90 asks the buyer 20 whether the buyer 20 wishes to authorize payment for the transaction 132 to the seller 28. Specifically, the front end program 90 sends a transfer-query message 140 to the buyer 20, as shown in FIG. 8. Using the information contained in the transfer-request message 129 from the seller 28, specifically the buyer's cardnumber 102B and the seller's cardnumber 102S, the front end program 90 looks up the buyer's name 103B and the seller's name 103S. As shown in FIG. 6E, the transfer-query message 140 contains: a transaction-identifier 142 uniquely-generated by the front end program 90, the buyer's name 103B, the seller's name 103S, the transfer type 130, the textual description of the transaction 132, and a transfer amount 135 in the currency preference 112B associated with the buyer's cardholder account (which may represent a currency exchange of the transaction amount 134 into the buyer's currency preference 112B and further which fixes the transfer amount, with respect to currency fluctuations, in the currency used by the buyer). In addition, if currency denomination exchange occurred, the original currency 112S and amount 134 are noted in the message 140. In the transfer-query message 140, the buyer's name 103B and the seller's name 103B are used instead of the buyer's cardnumber 102 and the seller's cardnumber 102S in order to minimize transmission of the cardnumber information over the Internet thereby improving security of the system. After sending the transfer-query message 140, the front end program 90 waits for a response from the buyer 20.

The buyer 20 may respond by sending a transfer-response message 150 to the front end computer 50 via the Internet, as shown in FIG. 8. As illustrated in FIG. 6F, the transfer-response message 150 contains the following data: the payment system generated transaction-identifier 142 and an indication 152 of the buyer's willingness to allow transfer of funds. The willingness indication 152 is one of "yes", "no", or, "fraud".

In a preferred embodiment, the structure of the transfer-query message 140 facilitates preparation of the transfer-result message 150 by the buyer 20. In the transfer-query message 140, the transaction-identifier 142 is placed in the "subject" of the transfer-query message 140 and the e-mail address to which the buyer's transfer-response message 150 should be sent (e.g. "response@card.com") is placed in the "sender's address" of the transfer-query message 140. Many conventional e-mail programs in use on the Internet, including many older programs, have a feature that will automatically read the "subject" and "sender's address" of a received message and format a reply message directed to the sender's address with the same "subject" as the received message. If the buyer 20 uses this common feature to send his transfer-response message 150 back to the payment system 10, the only information that the buyer 20 will have to add is the willingness indication 152 which is only a one word reply, (i.e. "yes", "no", or, "fraud").

Referring again to FIG. 8, if the buyer 20 indicates "yes" in the willingness indication 152, the front end program 90 then sends a transfer-result message 160 to the seller 28 via the Internet 12. As shown in FIG. 6G, the transfer-result message 160 contains the following information: the transaction-identifier 142, the seller's name 103S, the buyer's name 103B, the transfer type 130, the textual description of the transaction 132, the transfer amount 135 in the currency 112B associated with the buyer's cardholder account, the indication 152 of the buyer's willingness to allow transfer of funds, and the seller's transaction-identifier 136 if present in the originating transfer-request message 129. In addition, if currency denomination exchange occurred, the original currency 112S and amount 134 are noted in the transfer-result message 160. The front end program 90 transfers the transaction information, by batch processing, to the back end program 92 which adds the transaction information to a settlement queue 168. The settlement queue 168 is a data file located on the storage device 72 of the back end computer 52.

Referring back to the step shown in FIG. 8 where the buyer 20 sends the transfer-response message 150 back to the payment system 10, if the buyer 20 replies "no" in the willingness indicator 152, the front end program 90 sends a transfer-result 160 to the seller 28 with a "no" indication 152. In addition, a service charge to the buyer 20 may be generated. Information regarding the buyer's "no" reply in the transfer-response 150 is batched from the front end program 90 to the back end program 92 where a service charge may be added to the settlement queue 168 for the buyer 20. Further, if a "no" indication is received more than a certain number of times in a certain number of transactions over a certain time period, then the state 106B of buyer's account 100B will become "suspended". This is to prevent a user from making a practice of ordering and receiving information products without paying for them. If the buyer's account state 106B becomes suspended, this information is also transmitted by batch processing from the front end program 90 to the back end program 92 so that the cardholder account information on the back end computer 52 conforms to that on the front end computer 50.

Referring again back to the step shown in FIG. 8 where the buyer 20 sends the transfer-response message 150 back to the payment system 10, if the buyer 20 indicates "fraud" in the willingness indication 152, the payment system 10 changes the state 106B of the buyer's cardholder account 100B to "invalid". A response of fraud indicates that the buyer 20 never requested the information product 26. The information that the buyer 20 responded "fraud" to the willingness indication 152 is also transmitted by batch processing from the front end program 90 to the back end program 92 so that the cardholder account information on the back end computer 52 conforms to that on the front end computer 50.

Referring back to the step illustrated in FIG. 8 where the front end program 90 sends the transfer-query message 140 to the buyer 20, if a period of time elapses and the front end program 90 does not receive a transfer-response message 150 from the buyer 20, the front end program will send the transfer-query message 140 again, i.e. a second notice. The front end program 90 may send the transfer-query message to the buyer 20 several times until a response from the buyer 20 is obtained. If more than a certain number of days elapses, or more than a certain number of transfer-query messages 140 are outstanding for the buyer 20, and the front end program does not receive a transfer-response message 150 from the buyer 20, then the front end program 90 causes the buyer's cardholder account 100B to become suspended. This is done by changing the buyer's cardholder state 106B from "active" to "suspended". However, if a transfer-response 150 is received and/or the number of outstanding transfer-query messages 140 for the buyer 20 drops to less than a certain threshold, the buyer's account 100B may be returned to an "active" state. Further, any outstanding transfer-query messages 140 may be sent again some time later. 17

C. Accumulation And Settlement Of Transactions

1. Processing Charges To Buyers

Processing of the charges and credits between the back end computer 52 and the settlement system 30 is conducted off the Internet using secure communications channels. This isolates the buyer-seller activity which occurs on the Internet from the financial and credit activity which occurs off the Internet.

Referring to FIGS. 1 and 3, the back end program 92 regularly checks the accumulated purchase transactions for each cardholder in the settlement queue 168 for age and amount. For example, the back end program 92 checks whether the accumulated purchase transactions for a cardholder are either 30 days old or reach a threshold of at least $10.00. When the accumulated purchase transactions for a cardholder reach either the age or amount threshold, the back end program 92 batches the accumulated transactions into a single funds transfer transaction using the buyer's pay-in selection 108B associated with the buyer's cardholder account 100B. This is typically accomplished by posting a charge 194 to the buyer's credit card account. To post a charge on the buyer's credit card account, the back end program 92 transmits an accumulated charge 194 to the credit card system network 30 via the acquirer component 34 where the payment system 10 maintains a conventional merchant account. The credit card network includes a component 196 that initially checks the validity of the buyer's credit card number, e.g. pay-in selection 108B, to determine whether the credit card is lost, stolen, expired, overlimit, etc.

If the credit card network 30 refuses to process the buyer's credit card number, e.g. the credit card is lost, stolen, canceled, expired, etc., collection from the buyer is considered failed. The back end program 92 changes the buyer's cardholder state 106B to "suspended". The back end program 92 also sends the failure information, by batch processing, to the front end program 90 so that the buyer's cardholder state 106B on the front end computer 50 is also changed to "suspended".

Referring to FIG. 9, the front end program 90 then sends a payin-failure-notification message 210 to the buyer 20 over the Internet. As shown in FIG. 6H, the payin-failure-notification message 210 contains the notification-identifier 144 associated with the pay-in method 108, the transfer amount 134, and the currency 112S.

In addition, for each transaction associated with the payin-failure-notification message 210, the front end program 90 also sends a collection-failure-notification message 211 to the seller 28 over the Internet. As shown in FIG. 6I, this collection-failure-notification message 211 contains the server's transaction-identifier 138, and the amount 134 and currency 112 associated with the transaction.

Referring back to the step where the back end program 92 transmits the accumulated charge 194 to the credit card network 30, if the credit card network 30 accepts the buyer's card, the acquirer 34 then processes the accumulated charge 194 in the credit card system 30 to post the charge to the buyer's credit card in the usual manner by sending the appropriate information to the buyer's credit card issuer 32. The buyer's credit card issuer 32 sends the buyer 20 a credit card bill 190, typically via the postal system. The credit card bill 190 lists the accumulated charge 194 as an item on the user's credit card bill. Since accumulated charges 194 for a cardholder are sent to the acquirer 34 when they reach a certain threshold amount, more than one accumulated charge may be listed on the credit card bill sent to the buyer 20 by the buyer's credit card issuer 32.

The description previously set forth explains how the payment system can process a charge to the user using the conventional, commercially available credit card system. There are variations on and modifications of the previously set forth arrangement that may be utilized. For example, the issuer 32 may process a debit to a bank account of the buyer 20 instead of sending a credit card bill. Alternately, the issuer 32 may send the buyer a bill (other than a credit card bill) for the accumulated charges.

Referring back to the step where the back end program 92 sends the accumulated charge 194 to the credit card system 30, if the credit card system 30 accepts the buyer's credit card number, the back end program 92 sends indication of this acceptance, by batch processing, to the front end program 90. The front end program 90 sends a payin-notification message 212 to the buyer 20 via the Internet, as shown in FIG. 10. As shown in FIG. 6J, the payin-notification message 212 contains the cardnumber 102, the pay-in amount 134 in the currency 112 associated with the buyer's account, the notification-identifier 144 associated with the pay-in method 108, a list of accumulated transactions 146, and, optionally, a service charge 148.

2. Processing Payments To Sellers

Referring to FIG. 10, if the credit card system 30 accepts the accumulated transaction 194 from the back end program 92, the back end program 92 treats the payment as made by the buyer. The back end program 92 calculates fees associated with the transaction. For example, the back end program will subtract the charge applied by the credit card system 30 from the amount paid by the buyer. The back end program 92 will also subtract a service charge for the payment system 10. The back end program 92 will then calculate a net settlement to the seller for the transaction. The net settlement will be posted to the settlement queue 168 for the seller 28 located on the back end computer 52.

The back end program 92 periodically checks the settlement queue 168 to see if payments have accumulated for the seller 28. Regularly, the back end program 92 will batch the accumulated payment transactions into a single off-Internet transaction, using the pay-out method 110S associated with the seller's account 100S. In a preferred embodiment, transactions that have accumulated for a seller may be retained for a period of time before the single off-Internet payment transaction to the seller is made. This period of time may vary depending on the payment history of the seller. For example, a payment that is received from the credit card system 30 may be held for a period of 60 days before it is combined with other accumulated transactions and paid to the seller by means of the seller's indicated off-Internet payment method.

One way that a payment may be made to the seller is by direct deposit to a checking account maintained by the seller. The back end program 92 transmits information 197 to the settlement system 30 to make a direct deposit 198 to the seller's checking account 199. If the acquirer component 34 is a commercial bank, the back end component 92 may use the acquirer 34 to transmit the direct deposit information from the acquirer-bank to the seller's bank for direct deposit to the seller's checking account 199.

In addition to sending the information to the settlement system 30 to effect payment to the seller, e.g. by making a direct deposit to the seller's checking account, the back end program 92 also sends information, by batch processing, to the front end program 90 that an accumulated payment to the seller has been initiated. The front end program 90 then sends a message via the Internet informing a seller 28 that payment has been made to the seller's account. The front end program 90 sends a payout-notification message 214 to the e-mail address 104S associated with the seller's cardholder account. As shown in FIG. 6K, the payout-notification message 214 contains the cardnumber 102S, the pay-out amount 150 in the currency 112 associated with the cardholder's account, the notification-identifier 152 associated with the pay-out method 110, the list of accumulated transactions 146, and, optionally, a service charge 149.

D. Chargeback Transactions

Figure 11:
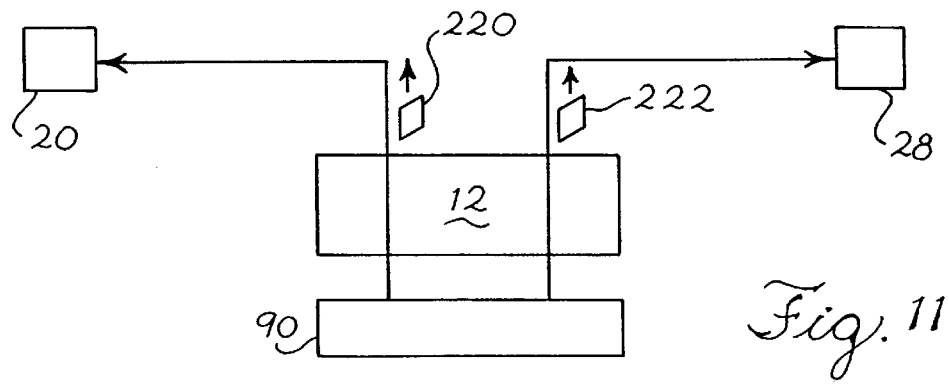
FIG. 11 is a flow chart showing message flow for a chargeback process using the payment system of FIG. 1.

A chargeback transaction occurs when a funds transfer associated with a previous payin-notification message results in a chargeback. Typically, this occurs when a buyer 20, whose pay-in method 108B is a credit card, disputes a charge on his credit card statement. FIG. 11 shows the message flow for a chargeback transaction having the following steps:

The front end program 90 sends a payin-chargeback-notification message 220 to the buyer 20 over the Internet. As shown in FIG. 6L, the payin-chargeback-notification message 220 contains the notification-identifier 144 associated with the pay-in method 108, and, the pay-in amount 134 in the currency 112 associated with the buyer's account 100.

Also as shown in FIG. 11, for each accumulated transaction associated with this chargeback, the front end program 90 also sends a payout-chargeback-notification message 222 to the seller 28 over the Internet. As shown in FIG. 6M, the payout-chargeback-notification message 222 contains the server's transaction-identifier 138, the amount 134, and the currency 112 charged back to the buyer 20.

E. Payment System Capability Transaction

Figure 12:
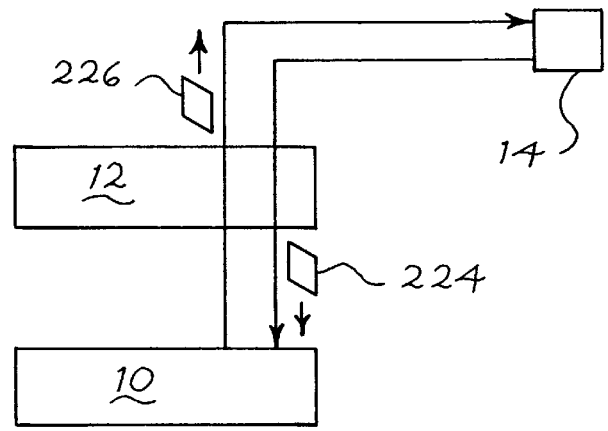
FIG. 12 is a flow chart showing message flow for a capabilities request process using the payment system of FIG. 1.

A payment system capability transaction occurs when a user wishes to ascertain the capabilities of a payment system 10. FIG. 12 shows the message flow for a payment system capability transaction having the following steps:

A user 14 uses the Internet 12 to send a capabilities-request message 224 to the payment system 90. As shown in FIG. 6N, the capabilities-request message 224 has no specific attributes, i.e. it contains no specific information fields, it may be only a query. The payment system 90 sends a capabilities-result message 226 to the user 14. As shown in FIG. 6O, the capabilities-result message 226 contains a list of supported transaction types and parameters 156, a list of supported currencies 158, and a list of supported languages 159.

F. Cardholder Application

Figure 13:
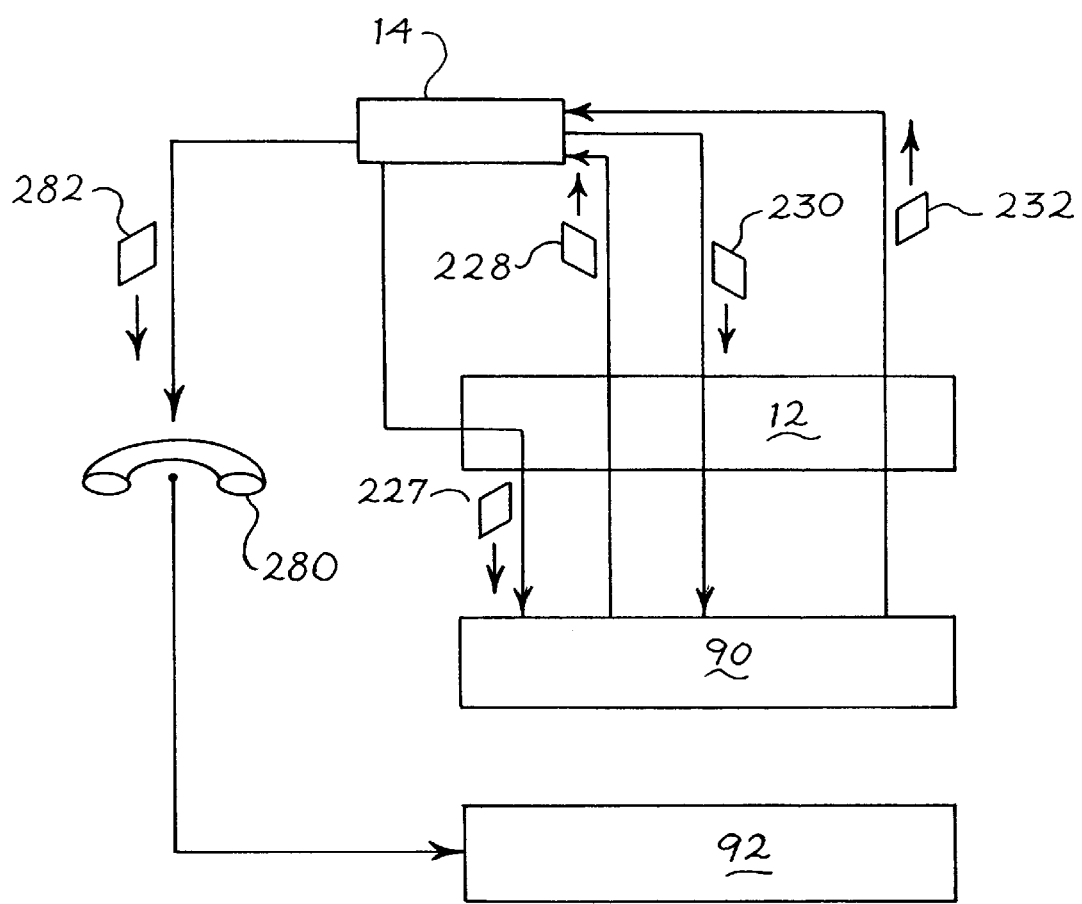
FIG. 13 is a message flow diagram showing messages for a new account transaction between a user and the payment system of FIG. 1.

A cardholder application transaction occurs when an Internet user 14 wishes to establish a cardholder account 100. FIG. 13 shows the steps for the application process for a cardholder application.

The user 14 sends an application-request message 227 over the Internet 12 to the payment system 90. This request may be sent by either electronic mail or using an interactive protocol. The payment system 90 sends an application-result message 228 to the user 14. As shown in FIG. 6P, the application-result message 228 is essentially a blank form into which the user enters information for the following: the applicant's name, address, phone number, Internet e-mail address 104, and the currency preference 112, language, and preferred account identifier ID.

The user 14 fills in parameters from the application-result message 228, and sends a newacct-request message 230 to the payment system 10. The payment system 10 sends the user 14 a newacct-result message 232. As shown in FIG. 6Q, the newacct-result message 232 contains the status 106 of the application, and if the application is approved, the cardnumber 102 assigned to the user 14.

It is noted that credit card numbers or other sensitive information relating to financial transaction are not sent over the Internet. The user who wishes to open a cardholder account sends only part of the required cardholder information over the Internet in the newacct-request message. In order to complete the cardholder application process, the user 14 provides his credit card information, checking account information, or other financial information to the payment system 10 through non-Internet channels. This credit card information, checking account information, or other financial information is maintained on the back end computer 52 of the payment system 10 in the secure data file 114. The user 14 calls a telephone number 280. This may be an 800 number in the U.S. or a toll number for foreign calls. The user 14 is prompted to enter his the credit card information 282 by touch tone entry. Thus, the user's credit card information is not transmitted over the Internet at any time thereby contributing to the security of the system.

IV. ADVANTAGES OF THE PAYMENT SYSTEM

In the embodiment of the invention described above, there is provided a new model for Internet commerce in which an information seller 28 carries the risk of non-payment. By shifting the risk of non-payment, the embodiment of the present invention avoids the necessity of guarantees of credit worthiness for sellers. This allows every participating Internet user to be both a buyer and a seller of information on the Internet. However, it is noted that various aspects of the model (e.g., buyer confirmation, limitations on buyers' refusals to pay, etc.) minimize a seller's risk to the point where it is offset by the expanded commerce base created.

Buyers of information products often cannot make a purchase decision unless the product is in hand. Given that there is virtually no cost for manufacturing and distribution, unwanted information products need not be "returned"; it is less costly merely to delete the unwanted information product. Buyers of information products pay only for the information that they can use, thereby avoiding the frustration of returning unwanted goods and asking for a refund as they would in a conventional marketplace Cardnumbers are bi-directional, i.e., a cardholder may engage in commerce as either a buyer or a seller. Hence, the terms "seller" and "buyer" are merely role-descriptors with respect to a given transaction, e.g., the cardnumber acting as a buyer in one transaction might be used in the merchant role for another transaction. Further, the term seller and buyer are generic in that they refer only to the direction of the funds transfer for a transaction. Hence, if a cardholder makes a charitable contribution to a non-profit organization, the cardholder is still referred to as the buyer and to the non-profit as the seller even though no actual "sale" is occurring.

Another advantage of the payment system is that it enables anyone with an information product to sell to have an available market. There is no age limit on information sellers.

The payment system described above is particularly advantageous for use on networks that do not have a centralized management authority, such as the Internet. Other such systems include FIDOnet and UUCP/Usenet, although it is recognized that these systems are considered by some to part of or associated with the Internet. The payment system described above could also be used on future versions, generations, etc., of the Internet. The payment system could also be used on centrally managed computer systems, such as America Online, Prodigy, etc.

Another aspect of the payment system described above is that it enables users to buy and sell information products over a quasi-public network, such as the Internet, regardless of where the users are located or where the payment system is located. Either the buyer or the seller may be located in the U.S. or outside the U.S. Also, some or all of the payment system components, such as the front end computer or the back end computer, may be located either in the U.S. or outside the U.S.

The foregoing detailed description should be regarded as illustrative rather than limiting and the appended claims including all equivalents are intended to define the scope of the invention.

We claim:

1. A system for enabling Internet users to make payments to other Internet users using the Internet comprising;
   a computer system having stored thereon cardholder accounts for Internet users, said cardholder accounts including Internet address information and financial information;
   and wherein said financial information is maintained isolated from said Internet address information so that said financial information is not accessible to Internet users via the Internet;
   programming code on said computer system for accepting a transaction request from a second Internet user to make a charge to a first Internet user;
   programming code on said computer system for inquiring of the first Internet user whether the first Internet user accepts the charge identified in said transaction request; and
   programming code on said computer system for processing the charge to the first Internet user using said financial information upon notification by the first Internet user of acceptance of the charge.

2. The system of claim 1 wherein said computer system comprises first and second computers and further p1 wherein said financial information for cardholder accounts is maintained on said first computer and said Internet address information for cardholder accounts is maintained on said second computer.

3. The system of claim 2 wherein said first computer and said second computer communicate by batch processing.

4. The system of claim 2 wherein said second computer includes a program for communicating with Internet users; and
   said first computer includes credit card processing information for Internet users stored thereon;
   said first computer connected to a credit card processing network.

5. The system of claim 4 wherein said first computer and said second computer transfer information by batch processing only.

6. A computer system for processing a payment of money on a network that is a quasi-public network having a large number of users, the system comprising:
   programming code means on said computer system for accepting a request via the quasi-public network from a second user to process the payment of money from a first user to the second user said request including information provided by the first user to the second user:
   programming code means on said computer system for using said information in is said request for preparing a message to said first user to be sent over the quasi-public network;
   programming code means on said computer system for sending said message inquiring of said first user via the quasi-public network whether the first user approves of the payment of money to said second user; and
   programming code means on said computer system for processing the payment of money from the first user by means of an off-network payment method associated with the first user if the first user responds positively via the quasi-public network to the inquiry message sent to the first user.

7. The system of claim 6 further comprising:
   means for processing the payment of money to the second user by means of an off-network payment method associated. with the second user if the first user responds positively via the quasi-public network to the message sent to the first user.

8. The system of claim 6 further comprising:
   programming means on said computer system for sending a transfer-query email message to the first user, said transfer-query e-mail message having:
   a transaction identifier as a subject of the transfer-query e-mail message;

an e-mail address to which the first user should respond as a sender's address of the transfer-query e-mail message; and an indication of the first user's willingness to approve the payment of money to the second user as a body of the transfer-query e-mail message.

9. The system of 6 in which the payment of money from the first user to the second user is for a delivery via the quasi-public network of an information product.

10. The system of claim 6 further comprising:

means for accumulating transactions associated with said first user until said transactions reach a threshold prior to the step of processing the payment of money, and in which the programming means for processing further comprises:

means for processing payment of money from the first user for said accumulated transactions.

11. The system of claim 10 in which said threshold is one of age and amount.

12. The system of claim 6 in which the programming means for processing step further includes:

means for subtracting a service charge from the amount of said payment of money approved to be paid by the first user to the second user.

13. the computer system of claim 4 further comprising:

programming means on said computer system for maintaining accounts for users of the quasi-public network, said accounts including:

payment processing information for said users, said payment processing information maintained isolated from access via said quasi-public network; and payment histories of users;

programming means on said computer system for receiving inquiries over the quasi-public network from some users regarding payment histories of other users; and programming means on said computer system for informing the inquiring users via the quasi-public network of the payment histories of the other users.

14. The system of claim 4 further comprising:

programming means on said computer system for enrolling users of said quasi-public network as cardholders, said programming means for enrolling comprising:

programming means for receiving application result messages from users via the quasi-public network, said application result messages including said users e-mail addresses;

programming means for receiving payment processing information from said users via other than said quasi-public network; and programming means for maintaining cardholder accounts for said users of the quasi-public network, said cardholder accounts including;

payment processing information for said users, said payment processing information maintained isolated from access via said quasi-public network; and payment histories of users; whereby transactions between said users may be conducted.

15. A computer system for processing a payment on a network that is a quasi-public network having a large number of users, the computer system comprising:

means for inquiring via the network of a first user whether the first user approves of a payment to a second user;

means for informing the second user via the quasi-public network whether the first user has approved of the payment to the second user; and means for processing the payment of money from the first user to the second user by means of off-network payment methods associated with the first user and the second user if the first user responds positively via the quasi-public network to the inquiry.

16. The system of claim 15 further comprising:

means for maintaining in a record associated with the first user an indication of a negative response if the first user responds negatively via the quasi-public network to the inquiry.

17. The system of claim 16 further comprising the step of:

means for receiving an inquiry from a third user via the quasi-public network regarding negative responses by the first user; and means for informing the third user via the quasi-public network regarding said negative responses by said first user.

18. The system of claim 15 further comprising the step of:

means for maintaining cardholder accounts for users of the quasi-public network.

19. The system of claim 15 wherein the quasi-public network is the Internet.

20. A method of enabling users of a quasi-public network to engage in the payment of money to other users of the quasi-public network, comprising:

maintaining accounts for users of the quasi-public network, said accounts including:

payment processing information for said users, said payment processing information maintained isolated from access via said quasi-public network; and payment histories of users;

receiving requests from some users to process payments from other users;

inquiring of the other users whether said other users wish to approve the payments requested to be processed by said some users;

receiving responses from at least a portion of said other users; and processing payments from those users of said portion of other users that reply positively to said inquires using said payment processing information.

21. The method of claim 20 further comprising:

updating said payment histories of at least that portion of said other users that reply negatively to said inquiries.

22. The method of claim 20 further comprising:

updating said payment histories of at least that portion of said other users that do not reply to said inquiries.

23. A method performed with a computer server for enabling commerce on the Internet between a first participant acting as a merchant and a second participant acting as a buyer said computer server installed on the Internet and having electronic mail capability, the method comprising the steps of:

sending a transfer request message over the Internet from the merchant to the computer server;

looking up in a database on the computer server an electronic mail address associated with an identification code included in the transfer request message;

sending a transfer query message from the computer server to the buyer;

sending a transfer response message from the buyer to the server;

sending a transfer result message from the server to the merchant;

sending a pay-in notification from the server to the buyer;

transferring a first amount of funds from the buyer to the server;

sending a funds transfer notification message from the server to the merchant;

transferring a second amount of funds from the server to the merchant; and sending a payout notification from the server to the merchant.

24. An information commerce process performed by a computer program on a server on a computer network to enable a transaction between a seller and a buyer, the process comprising the steps of:

a seller offering an information product for sale;

a buyer expressing an interest in the information product for sale;

the buyer sending a message to the seller including an identification number associated with the buyer;

the seller requesting the server to verify the identification number;

the seller sending the information product to the buyer;

the buyer being allowed time to evaluate the information product before payment;

the computer program using a database of identification numbers and user's network addresses to identify a user's network address associated with the identification number received from the seller:

the server sending a transfer query message to the buyer so that the buyer can decide whether to pay for the information product;

the buyer sending a response related to a decision by the buyer to purchase the information product to the server;

the server sending a message to the seller to inform the seller of said decision by the buyer; and the server recording details of completed sale transaction.

25. The process of claim 24 further comprising the steps of:

the server accumulating sale transactions for the buyer and periodically posting a bill to the buyer; and the server accumulating sale transactions for the seller and periodically making payment to seller.

26. A information commerce system using a computer network including electronic mail communication, the system comprising:

means for enrolling a plurality of cardholders by issuing a proprietary card account to computer network users having an electronic mail address;

a cardholder account associated with each cardholder including a computer network electronic. mail address, a proprietary card account number, a personal identification number used for authentication, a statement duration cycle time, a method of payment for credit balances; and means for conducting commerce transactions between two cardholders over the computer network using at least one of the cardholders' proprietary card account number wherein said commerce conducting means comprises means for accepting requests over the computer network to authenticate a representation of a first cardholder's personal identification number to a second cardholder:

means for communicating with said first cardholder's electronic mail address to inquire whether the representation was valid; and means for receiving a response from said first cardholder's electronic mail address in response to said communicating means.

27. The information commerce system of claim 28 wherein each cardholder account further comprises:

a pay-in method for each cardholder account;

a payout method for each cardholder account; and a currency type for the pay-in method and the payout method for each cardholder account;

a current state of the cardholder account; and wherein neither the pay-in method nor the payout method may be determined by inspection of the personal identification number.

28. A method for processing a payment of money on a network having a large number of users, the method implemented by a program running on a server connected to the network, said method comprising:

maintaining a database on the server, said database associating personal identification numbers of users with users' network addresses wherein a user's network address is not readily derivable from the user's personal identification number;

receiving a first message over the network from a first user, said first message identifying a transaction between said first user and a second user and including a personal identification number of said second user, said transaction involving a payment from said second user to said first user;

operating the database to identify a network address of said second user;

sending a second message over the network to said second user, said second message inquiring of said second user whether said second user approves of said transaction with said first user; and receiving a third message over the network from said second user, said third message indicating whether said second user approves said transaction.

29. The method of claim 28 further comprising the step of:

processing the payment from said second user to said first user by means of an off-network payment method associated with said second user if said second user responds positively via the network to said second message.

30. The method of claim 28 wherein said second message requests said second user to reply with a response that is one of: yes, no, and fraud.

31. The method of claim 28 wherein said second message includes a sender's network address, and further wherein said sender's network address is a network address to which said third network message is sent.

32. The method of claim 28 wherein said third network message includes a body in which said second user indicates whether approval is provided for said transaction.

33. A computer system for permitting authentication of transactions on a computer network having a large number of users, the system comprising:

means for receiving a first message over the network from a first user wherein said first message identifies a transaction between said first user and a second user;

means for sending a second message over the network to said second user, said second message inquiring of said second user whether said second user approves of said identified transaction with said first user; and means for receiving a third message over the network from said second user, said third message indicating whether said second user approves said identified transaction.

34. The computer system of claim 33 further comprising:
means for sending information to a system off the network for processing a payment for said transaction, said information sending means responsive to said third message receiving means.

35. A process for authenticating a transaction between users on a computer network having a large number of users, the process comprising:
receiving a first message over the network from a first user, said first message identifying a transaction between said first user and a second user and including an identification code;
associating said identification code received with said first message with an address of said second user on the computer network:
sending a second message over the network to said second user's address, said second message inquiring of said second user whether said second user approves of said transaction with said first user; and
upon receipt of a third message over the network from said second user indicating approval of said transaction, sending an indication of such approval to a system off the network for processing of a payment for said transaction.

36. The process of claim 35 wherein said computer network includes the Internet.

37. The process of claim 35 wherein said messages are e-mail messages.

38. A method for providing authentication between parties on a quasi-public network, the method comprising:
providing a first party who has an address on the quasi-public network with an identification code;
receiving a first message over the quasi-public network from a second party to whom the first party has provided said identification code, said first message including said identification code;
associating said identification code with said first party's address on the quasi-public network;
sending a second message over the quasi-public network to the first party's address on the quasi-public network to confirm that authentication should be provided to the second party; and
providing an indication to the second party regarding the authentication of the first party based upon a response from the first party to said second message.

39. The method of claim 38 wherein said response from the first party is a reply e-mail message.

40. The method of claim 38 wherein said second message includes a sender's address and wherein said response is sent to said sender's address.

41. The method of claim 38 wherein said step of providing an indication further comprises:
sending a third message over the quasi-public network to the second party including an indication of whether authentication has been made.

42. The method of claim 38 wherein said steps of receiving, associating, sending and indicating are performed on a server.

43. The method of claim 38 wherein said quasi-public network is the Internet.

44. The method of claim 38 wherein said second message is an e-mail message.

45. The method of claim 38 wherein said first message is an e-mail message.

46. The method of claim 38 wherein said first party's address is an e-mail address.

47. The method of claim 38 wherein said second message requests confirmation from the first party relative to a transaction between the first party and the second party.

48. The method of claim 38 wherein said identification code is not derivable from the first party's address.

49. The method of claim 38 wherein said first message further includes an identification of a transaction and a money amount of the transaction.

50. The method of claim,38 wherein said step of providing an identification code further comprises the step of:
formulating an identification code that bears no relationship to the first party's address on the quasi-public network.

51. A system for providing authentication between users of a quasi-public network wherein said each of said users has an address on the quasi-public network, the system comprising:
a server connected to the quasi-public network;
a database on the server that associates users' identification numbers with respective users' network addresses; and
a program operating on the server that receives messages over the quasi-public network, said program comprising:
a means for looking up in said database a first user's network address associated with a first user's identification number upon receiving a first message over the quasi-public network from a second user that includes said first user's identification number;
a means for sending a second message over the quasi-public network to the first user's network address, said sending means being responsive to said looking up means; and
a means for sending a third message to said second user, said third message providing an indication regarding whether authentication has been received from the first user's network address to said second message.

52. The system of claim 51 wherein said database is located on a computer-readable storage medium.

53. The system of claim,51 wherein said program is located on a computer-readable storage medium.

54. The system of claim 51 wherein the second message includes a sender's address.

55. The system of claim 51 wherein said quasi-public network is the Internet.

56. The system of claim 51 wherein said second message is an e-mail message.

57. The system of claim 51 wherein said first message is an e-mail message.

58. The system of claim 51 wherein said first user's network address is an e-mail address.

59. The system of claim 51 wherein said second message requests confirmation from the first user relative to a transaction between the first user and the second user.

60. The system of claim 51 wherein said first user's identification number is not derivable from the first user's network address.

61. The system of claim 51 wherein said first message further includes an identification of a transaction and a money amount of the transaction.

62. A computer usable medium having computer readable program code means embodied therein for use on a quasi-public computer network to provide authentication between parties who communicate electronically with each other and have addresses on said network, the computer readable program code means adapted to run on a server connected to the quasi-public network, the computer program readable program code means comprising:

computer readable program code for receiving a first message over the quasi-public network from one of said parties to whom another of said parties has provided an identification code, said identification code having been provided to said another of said parties, said first message including said identification code;

computer readable program code means for associating said identification code with the another of parties' address on the network;

computer readable program code means for sending a second message over the quasi-public network to the another of said parties' address on the network to confirm that authentication should be provided to the one of said parties; and computer readable program code means for providing an indication to the one of said parties regarding the authentication of the another of said parties based upon a response from the another of said parties to said second message.

\* \* \* \* \*

UNITED STATES PATENT AND TRADEMARK OFFICE
CERTIFICATE OF CORRECTION

PATENT NO. : 5,826,241
DATED : October 20, 1998
INVENTOR(S) : Lee H. Stein et al.

It is certified that error appears in the above-identified patent and that said Letters Patent is hereby corrected as shown below:

Title page, column 2,
Lines 4-5, change "jacqueline" to -- Jacqueline --.
Line 13, change "ointly develop" to -- jointly develop --.
Line 14, change "abstrat" to -- abstract --.
Line 16, under "ABSTRACT", change "regarding whether the" to -- regarding the --.

Page 2, column 2,
Line 2, change "Avrsion" to -- Aversion --

Claim 1,
Line 2, change "comprising;" to -- comprising: --.

Claim 2,
Line 2, delete "p1".

Claim 6,
Line 7, change "user said" to -- user, said --.
Line 9, change "user:" to -- user; --.
Line 11, change "in is said" to -- in said --.

Claim 7,
Line 4, change "associated. with" to -- associated with --.

Claim 9,
Line 1, change "system of 6" to -- system of claim 6 --.

Claim 13,
Line 1, change "the computer" to -- The computer --.

Claim 14,
Line 7, change "said users" to -- said users' --.

Claim 24,
Line 18, change "seller:" to -- seller; --.

UNITED STATES PATENT AND TRADEMARK OFFICE
CERTIFICATE OF CORRECTION

PATENT NO.    : 5,826,241
DATED         : October 20, 1998
INVENTOR(S)   : Lee H. Stein et al.

It is certified that error appears in the above-identified patent and that said Letters Patent is hereby corrected as shown below:

Claim 26,
Line 1, change "A information" to -- An information --.
Line 8, change "electronic. mail" to -- electronic mail --.
Line 20, change "cardholder:" to -- cardholder; --.

Claim 35,
Line 10, change "network:" to -- network; --.

Claim 50,
Line 1, change "claim,38" to -- claim 38 --.

Claim 53,
Line 1, change "claim,51" to -- claim 51 --.

Signed and Sealed this

Eleventh Day of December, 2001

*Attest:*

*Attesting Officer*

NICHOLAS P. GODICI
*Acting Director of the United States Patent and Trademark Office*